R. WOLF.
LOCK NUT.
APPLICATION FILED APR. 1, 1911.
1,073,009.
Patented Sept. 9, 1913.
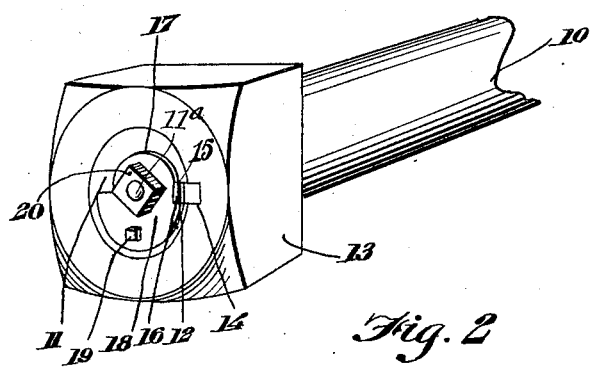
Inventor
Ralph Wolf
By Victor J. Evans
Attorney
Witnesses
A. W. Gardes

UNITED STATES PATENT OFFICE.

RALPH WOLF, OF FRANKTOWN, COLORADO, ASSIGNOR OF ONE-FOURTH TO JAMES P. McINROY, OF LARKSPUR, COLORADO.

LOCK-NUT.

1,073,009.  Specification of Letters Patent.  Patented Sept. 9, 1913.

Application filed April 1, 1911. Serial No. 618,293.

*To all whom it may concern:*

Be it known that I, RALPH WOLF, a citizen of the United States, residing at Franktown, in the county of Douglas and State of Colorado, have invented new and useful Improvements in Lock-Nuts, of which the following is a specification.

An object of the invention is to provide a device for releasably locking a nut to the end of a vehicle axle.

For the purpose mentioned, use is made of a threaded shank extending laterally outward from the end of the vehicle axle, the said vehicle axle being provided with a groove extending inwardly from the periphery of the vehicle axle at the outer end thereof, a cam lock mounted to turn on the said shank and provided with a cam slot, a nut for engagement with the vehicle axle and a locking member adapted to operate in the slot of the vehicle axle and movable into a slot formed in the inner side of the said nut, the slot in the said nut being adapted to aline with the slot in the said axle and the said locking member having an end extending into the said cam slot so that the said locking member will be moved to engage the said nut when the cam lock is operated, a nut being secured to the outer end of the shank to substantially retain the cam lock on the said shank.

Reference is to be had to the accompanying drawings constituting a part of this specification, in which similar characters of reference denote corresponding parts in all the views, and in which—

Figure 1 is a perspective view of the outer end of a vehicle axle, showing my nut lock attached thereto. Fig. 2 is a longitudinal sectional view, the cam lock being in locked position. Fig. 3 is an end view with the cam lock and the retaining nut of the shank removed therefrom. Fig. 4 is a perspective view of the cam lock.

Referring more particularly to the views, I employ a vehicle axle 10 having a shank 11 extending laterally outward from the outer end thereof and disposed centrally from the vehicle axle is a groove 12 formed at the outer end of the vehicle axle and extending diametrically inward from the periphery of the vehicle axle. A nut 13 is provided for threaded engagement with the outer end of the vehicle axle 10 and the said nut is provided with a groove 14 adapted to aline with the groove 12 when the said nut is disposed on the vehicle axle. A locking member 15 is provided to slide in the groove 12 and is adapted to have an end thereof move into the groove 14 of the nut 13. The locking member 15 is provided with a lug 16 adapted to engage a cam edge 17 of a cam lock 18 turnably mounted on the shank 11 and the said cam lock 18 is provided with a handle 19, the said cam lock being held on a threaded pin 11ª projecting from the shank 11 by a retaining nut 20.

The diameter of the cam lock 18 is preferably made a trifle smaller than the inside diameter of the nut 13 so that the said nut 13 can be removed from the vehicle axle 10 without first disengaging the cam lock 18 from the shank 11. In the operation of my device when the nut 13 has been threadedly connected to the vehicle axle 10, the cam lock 18 is turned so that the lug 16 of the locking member engaging the cam edge 17 of the cam lock 18 will move the outer end of the locking member 15 into the groove 14 of the nut 13, thus rigidly securing the nut relatively to the vehicle axle 10, as will be readily seen by referring to Fig. 1. To unlock the nut 13 relatively to the vehicle axle 10, the cam lock 18 is moved to permit the disengagement of the locking member 15 from the nut 13 and the nut can then be unscrewed from the vehicle axle 10.

Having thus fully described the invention, what I claim as new, is:—

In a nut lock, the combination with a shank provided with a groove, of a nut for threaded connection with the said shank and provided with a groove adapted to register with the groove in the shank, a locking member mounted to slide in the groove of the shank and extending into the groove of the nut, a cam carried by the said shank and having a cut away portion forming a cam edge on the cam, a lug projecting laterally from the said locking member to engage the cam edge of the cam, a handle projecting laterally from the outer face of the cam for turning the same on the said shank, and a retaining nut for threaded connection with the shank to retain the cam in position thereon.

In testimony whereof I affix my signature in presence of two witnesses.

RALPH WOLF.

Witnesses:
 TH. CHRISTENSEN,
 A. D. CASEY.